Jan. 28, 1964    H. K. SKRAMSTAD    3,119,928
COMPONENTS FOR A COMBINED DIGITAL-ANALOG
DIFFERENTIAL ANALYZER
Filed Nov. 29, 1960    5 Sheets-Sheet 2

INVENTOR

Harold K. Skramstad

BY David Gobbins
John C. Stahl   ATTORNEYS

Fig. 4

Jan. 28, 1964     H. K. SKRAMSTAD     3,119,928
COMPONENTS FOR A COMBINED DIGITAL-ANALOG
DIFFERENTIAL ANALYZER
Filed Nov. 29, 1960     5 Sheets-Sheet 5

INVENTOR
Harold K. Skramstad

BY David Gubbins
John C. Stahl    ATTORNEYS

United States Patent Office 3,119,928
Patented Jan. 28, 1964

3,119,928
COMPONENTS FOR A COMBINED DIGITAL-ANALOG DIFFERENTIAL ANALYZER
Harold K. Skramstad, Washington, D.C., assignor to the United States of America as represented by the Secretary of Commerce
Filed Nov. 29, 1960, Ser. No. 72,540
19 Claims. (Cl. 235—150)

This invention relates to components for a differential analyzer and in particular to an integrator and a multiplier unit, each using digital and analog techniques.

A differential analyzer, used for solving differential equations, may be either analog or digital. The analog analyzer has the disadvantage of low precision and low dynamic range, which is the ratio of the largest value to the least value the device can represent. The digital differential analyzer, although capable of providing any degree of precision or dynamic range, is slow in operation and subject to possible instability of solution due to the use of finite difference calculus in integration. Since the reading can be taken only to the nearest full significant digit at discrete intervals of time, it is possible to obtain the reading closest but not exactly equal to the least significant digit.

Accordingly, it is an object of the present invention to provide an integrator and multiplier unit for a differential analyzer so that the latter may combine the analog advantages of high speed and continuous representation of variables with the digital capabilities of high precision and large dynamic range.

This is accomplished by providing combined digital-analog integrator and multiplier units. The dependent variables, applied to the input and obtained as an output of each unit, are represented by two quantities, a digital number representing the more significant part and an electrical voltage representing the least significant part. As in the electronic analog computer, the independent variable is always time. The integrator and multiplier units may be combined in an analyzer in various arrangements depending upon the particular differential equation to be solved.

In an embodiment of the integrator unit employing an $x_D$ register and an R register, the digital input from preceding units in an analyzer is applied to the $x_D$ register, and the analog input is applied to a first analog integrator. At the beginning of each period, the values in the $x_D$ and R registers are sampled and converted to a first and second analog signal, respectively, which are held constant during the period, unaffected by future changes in the registers occurring during the period. The first analog signal is applied to a second analog integrator. Then the magnitudes of the second analog signal and the outputs of the first and second integrator are combined in an analog summer. If at any time during the period, the voltage at the output of the analog summer exceeds a predetermined upper threshold, it is sensed by a comparator and at the proper time unity is subtracted from the R register and α, defined below, is added to the input register in the following integrator unit of the analyzer. Conversely, if the voltage at the output of the analog summer falls below a predetermined lower threshold, unity is added to the R register and α is subtracted from the input register of the following integrator unit. The digital number in the $x_D$ register is added to the number in the R register. The output of the integrator unit is represented by a digital part in the latter register and an analog part indicated by the magnitude of the voltage appearing in the output of the analog summer.

In an embodiment of the multiplier unit, digital signals derived from preceding units in an analyzer are applied to a control unit while a pair of analog signals derived from other units are applied to a first and second digital-to-analog converter. The relationship between the control unit, an $x_D$, $y_D$ and an R register and an adder is such that during each time interval, under the control of the digital signals applied to the control unit, to the contents of the R register, the following is added: $my_D + nx_D + mn\alpha$ where $y_D$ and $x_D$ are the contents of the $x_D$ and $y_D$ registers, respectively, α is the least significant digit, and $m$ and $n$ are ±1 or 0. The pair of analog input signals are multiplied together, attenuated by α and applied to an analog summer. At the beginning of each period the digital numbers of the $x_D$, $y_D$ and R registers are sampled and converted to analog signals which are also applied to the analog summer. The output of the latter is fed to a comparator in such a manner that if the output voltage of the summer exceeds (or falls below) predetermined threshold voltages, unity is subtracted from (or added to) the R register and signals which may effect the addition (or subtraction) of α are applied to a digital register located in a succeeding unit of the analyzer. The product of the analog and digital input signal is represented by the digital part in the latter register and an analog part indicated by the magnitude of the voltage appearing in the output of the analog summer.

In the figures.

$$\dot{x} = -x, \quad \dot{x}' = x$$

Figure 1:
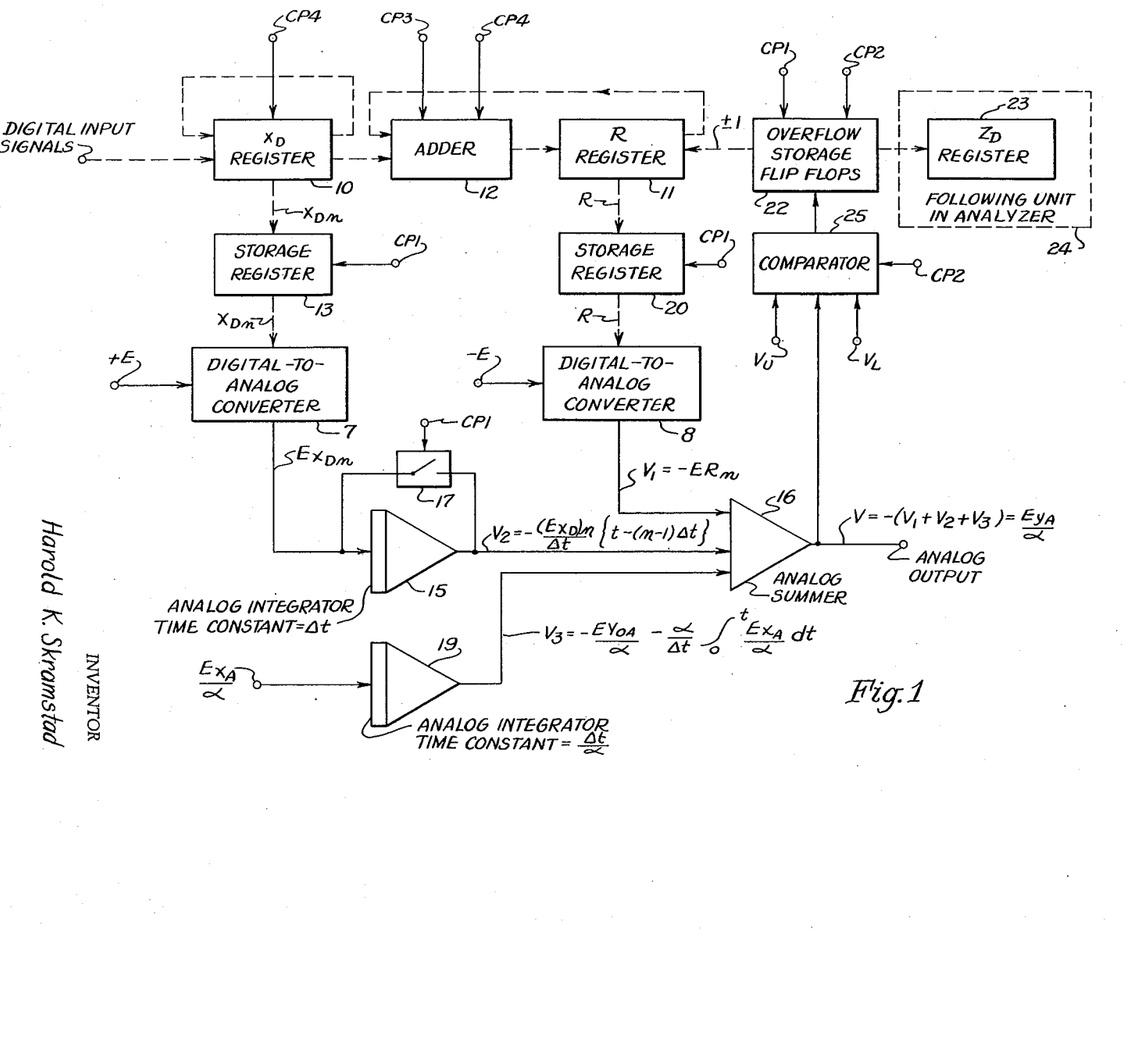
FIG. 1 is a block diagram of an integrator unit.

Referring to FIG. 1, which is a block diagram of an integrator unit, the dotted and solid lines indicate the flow of digital and analog information, respectively. A voltage having a magnitude $+E$ is applied to digital-to-analog converter 7 while a voltage having a magnitude $-E$ is applied to digital-to-analog converter 8. An analog voltage having a magnitude $$\frac{Ex_A}{\alpha}$$

derived from the preceding unit in the analyzer, is fed to analog integrator 19, which has a time constant equal to $$\frac{\Delta t}{\alpha}$$

and the digital output from another unit in ±α increments is fed to $x_D$ register 10.

The value of E in analog is equivalent to the value of α in digital. Thus, where $\alpha = 0.1$ and $E = 100$ volts, a number represented as 28.4 (digital) +72 volts (analog) may also be represented as 28.3 (digital) +172 volts (analog). For any given problem, α is chosen to provide the desired compromise between speed of solution and precision but subject to the limitation that should not exceed $$\left|\frac{dx}{dt}\right|_{max.}$$

$$\frac{\alpha}{\Delta t}$$

As a simple illustration, consider integration of the function $x = A \sin \omega t$, and assume $\Delta t$ equals .001 second, $\alpha=.001$, and A is 1. Since the maximum time rate of change of this function $A\omega$ should not exceed $$\frac{\alpha}{\Delta t}$$

the highest frequency representable at full-scale amplitude would be $$\omega = \frac{\alpha}{A\Delta t} = 1 \text{ radian per second}$$

and the precision (assuming an analog resolution of .001) would be one part in one million. If we chose $\alpha=.1$, the highest frequency representable at full-scale amplitude would be 100 radians per second, and the precision would be one part in ten thousand.

The output of $x_D$ register 10 and R register 11 are applied to adder 12, the output of the adder to register 11, and the output of register 10 to the input of that register. Thus, the digital registers and adder perform the operation of serial addition, as indicated in detail below, although other types of addition may obviously be used. The output of R register 11 is transferred through storage register 20 to digital-to-analog converter 8 where it is converted to an analog voltage given in the $n$th interval of $\Delta t$ by:

$$V_1 = -ER_n \qquad (1)$$

which is applied to analog summer 16. The output of register 10 is transferred to storage register 13 and then applied to digital-to-analog converter 7 where it is converted to an analog voltage having a magnitude $Ex_{D_n}$ during the $n$th interval of $\Delta t$. The output of converter 7 is applied to resettable analog integrator 15 which has an output:

$$V_2 = -\frac{(Ex_D)_n}{\Delta t}\{t-(n-1)\Delta t\} \qquad (2)$$

that is applied to analog summer 16. Reset switch 17 is connected across the analog integrator. The output of analog integrator 19, which has a time constant equal to $$\frac{\Delta t}{\alpha}$$

is applied to analog summer 16 and is represented by:

$$V_3 = -\frac{Ey_{0A}}{\alpha} - \frac{\alpha}{\Delta t}\int_0^t \frac{Ex_A}{\alpha}dt \qquad (3)$$

where $y_{0A}$ is the value of $y_A$ at zero time.

The above three voltages are added in analog summer 16 to give the analog part of the output of the integrator unit which is:

$$\frac{Ey_A}{\alpha} = V = -(V_1 + V_2 + V_3) \qquad (4)$$

Overflow storage flip-flops 22 are positioned between register 11 and $y_D$ register 23 which is located in the following unit 24 in the analyzer. The output of analog summer 16 is fed to comparator 25 which controls flip-flops 22 in dependency upon the comparison between V and $V_U$ and V and $V_L$. Comparator 25 is identical to comparator 51 shown in detail in FIG. 6 and overflow storage flip-flops 22 comprise flip-flop registers 133, 134.

An upper threshold voltage $V_U$ and a lower threshold voltage $V_L$ is applied to comparator 25. Clock pulse CP1 is applied to storage registers 13, 20, storage flip-flops 22 and reset switch 17, clock pulse CP2 to comparator 25 and the storage flip-flips, clock pulses CP3, CP4 to adder 12 and clock pulse CP4 to $x_D$ register 10. The clock pulses, each having a period $\Delta t$, may be provided by conventional signal generator, not shown.

The number of digits required in registers 10 and 11 will depend upon the minimum value of $\alpha$ for which provision is to be made; the minimum value of $\alpha$ will be one in the last significant digit of register 10. In general register 11 should contain one more binary digit than register 10 to prevent overflow under conditions where a large digital number of the same sign as the digital number in register 11 is added to the latter register.

Digital-to-analog converters 7, 8 should be capable of holding their output values constant during each period of $\Delta t$ and equal to its value at the beginning of the period, and then rapidly changing to its new value at the beginning of the next period. The components should be selected so that the necessary serial addition of the information in $x_D$ register 10 to R register 11, subtractions of ±1 from register 11, and incrementing $y_D$ register 23 in the following unit are completed in $\Delta t$. Resettable analog integrator 15 may in certain applications consist of two analog integrators with switching between them so that each is used to integrate during alternate $\Delta t$ periods while the other is being reset.

The integrator unit disclosed in FIG. 1 may be used to obtain the solution to the following:

$$y = y_0 + \frac{1}{T}\int_0^t x\,dt \qquad (5)$$

where $x$ and $y$ are functions of time, $y_0$ is the value of $y$ at zero time and T is "time constant" of integration, the latter is equal to $$\frac{\Delta t}{\alpha}$$

as demonstrated below. As in the conventional digital differential analyzer, it is necessary that the problem be scaled so that the maximum value of all dependent variables will not exceed unity. Let each of the two dependent variables $x$ and $y$ consist of a digital part and an analog part, denoted by the subscripts D and A, respectively and let the values of the variables $x$ and $y$ at zero time be indicated by the subscript 0D and 0A. Thus, we have:

$$x = x_D + x_A \qquad (6)$$

$$y = y_D + y_A \qquad (7)$$

$$y = y_{0D} + y_{0A} + \frac{1}{T}\int_0^t (x_D + x_A)dt \qquad (8)$$

Let us assume time to be divided into discrete equal intervals of duration $\Delta t$ and that the digital parts of $x$ and $y$ can change only at times which are integral multiples of $\Delta t$. We may then write for the value of $y$ at a time $t$ somewhere in the $n$th interval:

$$y = y_{0D} + y_{0A} + \frac{1}{T}\left[\sum_{i=1}^{n-1}(x_D)_i \Delta t + (x_D)_n\{t-(n-1)\Delta t\} + \int_0^t x_A dt\right] \qquad (9)$$

where $(x_D)_i$ is the value of $x_D$ during the $i$th interval $\Delta t$.

Figure 2:
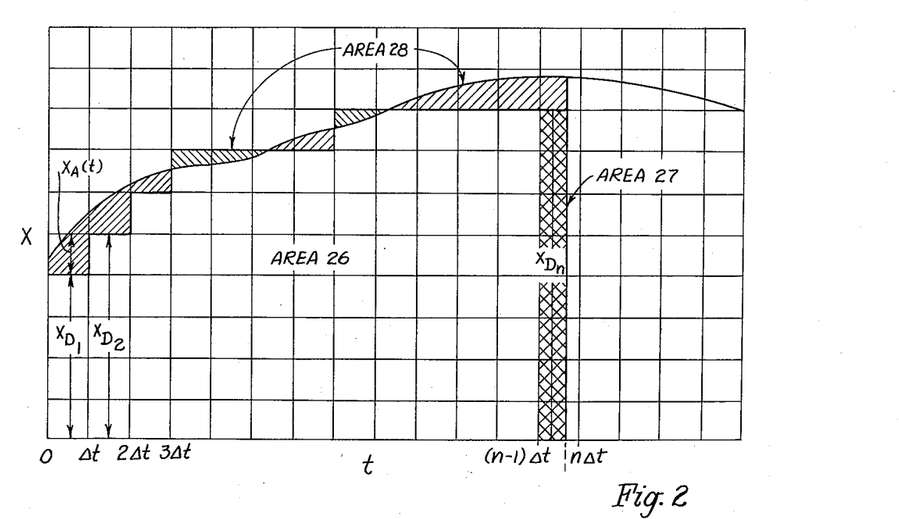
FIG. 2 is a diagram of the integration method.

FIG. 2 shows a curve of $x$ as an arbitrary function of $t$. The area under this curve from $t=0$ to any arbitrary $t$ would equal $yT$ in Equation 9 assuming that the first two terms ($y_{0D}$ and $y_{0A}$) on the right of Equation 9 are 0. The first term in the bracketed expression, represented by area 26, is the integral of the digital part of $x$ up to the time $(n-1)\Delta t$. The second term in the bracketed expression, represented by area 27, is the integral of the digital part of $x$ between $(n-1)\Delta t$ and $t$. The term represented by area 28 is the integral of the analog part of $x$ from $t=0$ to $t$.

It will now be shown that the time constant T of the integrator unit in FIG. 1 is equal to $$\frac{\Delta t}{\alpha}$$

and that a value derived from the solution of Equation 9 is represented by the digital part in $Z_D$ register 23 and the analog part indicated by the magnitude of the voltage appearing in the output of analog summer 16.

Assume that from time 0 up to a time $t$ during the $n$th interval $\Delta t$, storage flip-flops 22 have caused N subtractions of unity from R register 11, and the addition of N to the $y_D$ register 23. The contents of R register at this time is:

$$R = \sum_{i=1}^{n-1}(x_D)_i - N \quad (10)$$

and the value of the digital number $y_D$ in register 23 is given by:

$$y_D = y_{0D} + N\alpha \quad (11)$$

Substituting Equations 1, 2, 3 and 10 into 4 and solving for $y_A$, we obtain:

$$y_A = \alpha \sum_{i=1}^{n-1}(x_D)_i - N\alpha + \frac{\alpha}{\Delta t}(x_D)_n \{t-(n-1)\Delta t\}$$

$$+ y_{0A} + \frac{\alpha}{\Delta t}\int_0^t x_A dt \quad (12)$$

Adding Equation 11 and 12, we have:

$$y = y_D + y_A = y_{0D} + y_{0A}$$

$$+ \frac{\alpha}{\Delta t}\left[\sum_{i=1}^{n-1}(x_D)_i \Delta t + (x_D)_n\{t-(n-1)\Delta t\} + \int_0^t x_A dt\right] \quad (13)$$

Equation 13 is seen to be identical to Equation 9 if $$T = \frac{\Delta t}{\alpha}$$

Thus, the time constant of the integrator unit in FIG. 1 is $$\frac{\Delta t}{\alpha}$$

and the integrator unit provides the solution to Equation 9 and consequently Equation 5 under the conditions indicated.

In a typical operation of the integrator unit in FIG. 1, at the start of the time interval between $n\Delta t$ and $(n+1)\Delta t$ (see FIG. 3), analog integrator 15 is reset and storage flip-flops 22 are cleared by clock pulse CP1. The clock pulse also transfers the information in registers 10, 11 to storage registers 13, 20, respectively, which in effect transfers the digital information in registers 10, 11 to analog converters 7 and 8. The voltages $V_1$, $V_2$, $V_3$ are added in analog summer 16 to provide voltage V which is applied to comparator 25 so that in response to clock pulse CP2, a sample pulse, effects a comparison between voltage $V_U$ and V and between voltage $V_L$ and V. These comparisons will indicate one of three conditions: either voltage V is less than voltage $V_L$ or voltage V is greater than voltage $V_L$ and less than $V_U$ or voltage V is greater than voltage $V_U$. Signals indicating this information are fed to storage flip-flops 22 where they are employed to control registers 11, 23. If the first condition just mentioned occurs then +1 is added to register 11, if the third condition occurs −1 is added to the register and if the second condition occurs the information in register 11 is not altered. In response to clock pulse CP2, the digital information in register 23 is decreased by $\alpha$ under the first condition described above, increased by $\alpha$ under the third condition and left unaltered under the second condition.

If the information in registers 10, 11 and 23 is represented by $x_D$, R and $y_D$, the end results of the comparison made in comparator 24 may be summarized as follows:

| $V<V_L$ | $V_L<V<V_U$ | $V_U<V$ |
|---|---|---|
| add $(x_D+1)$ to R | add $x_D$ to R | add $(x_D-1)$ to R |
| add $-\alpha$ to $y_D$ | | add $+\alpha$ to $y_D$ |

Clock pulses CP3 effect the addition of the digital information in $x_D$ register 10 bit by bit to the digital information in R register 11 while clock pulses CP4 transfer the digital information in the output of register 10 to the input of that register and the output of adder 12 to an input of register 11. Thus, registers 10, 11 and adder 12 in response to clock pulses CP3, CP4 effect an operation commonly known as serial addition, although other types of addition may obviously be used.

Figure 4:
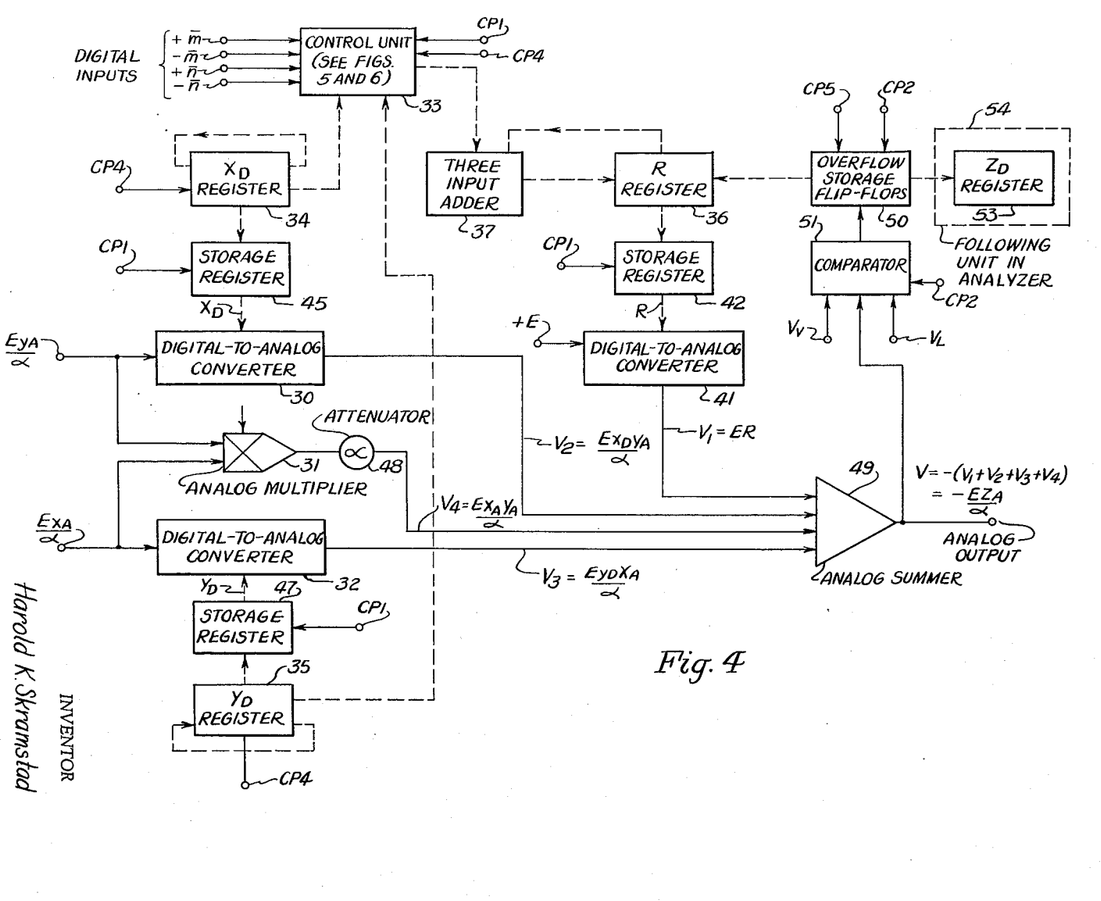
FIG. 4 is a block diagram of a multiplier unit.

Referring to FIG. 4, the combined analog-digital multiplier disclosed may be used to obtain the product of $Z=xy$. Assuming, as in connection with FIG. 1, that each variable consists of a digital part and an analog part, we have:

$$Z = Z_D + Z_A = x_D y_D + x_A y_D + x_D y_A + x_A y_A$$

where the subscripts D and A signify the digital and analog parts, respectively. Assume, as before, that time is divided into equal intervals of duration $\Delta t$, and that the digital parts $x_D$ and $y_D$ can change only at times which are integral multiples of $\Delta t$. Again, the dotted and solid lines indicate the flow of digital and analog information, respectively.

An analog voltage having a magnitude $$\frac{Ey_A}{\alpha}$$

is applied in parallel to digital-to-analog converter 30 and analog multiplier 31, and a voltage having a magnitude $$\frac{Ex_A}{\alpha}$$

is applied in parallel to digital-to-analog converter 32 and the multiplier. The digital outputs from other units in the analyzer indicated by signals $+\overline{m}$, $-\overline{m}$, $+\overline{n}$, and $-\overline{n}$, which are defined below, are applied to control unit 33. The outputs of $x_D$ and $y_D$ registers 34, 35 are applied to control unit 33 which is connected to three-input adder 37. The output of the adder is applied to register 36 and the output of each register 34, 35 is connected to its own input. Registers 34 to 36 may be any one of a variety of conventional serial shift, incremental, digital registers.

Figure 5:
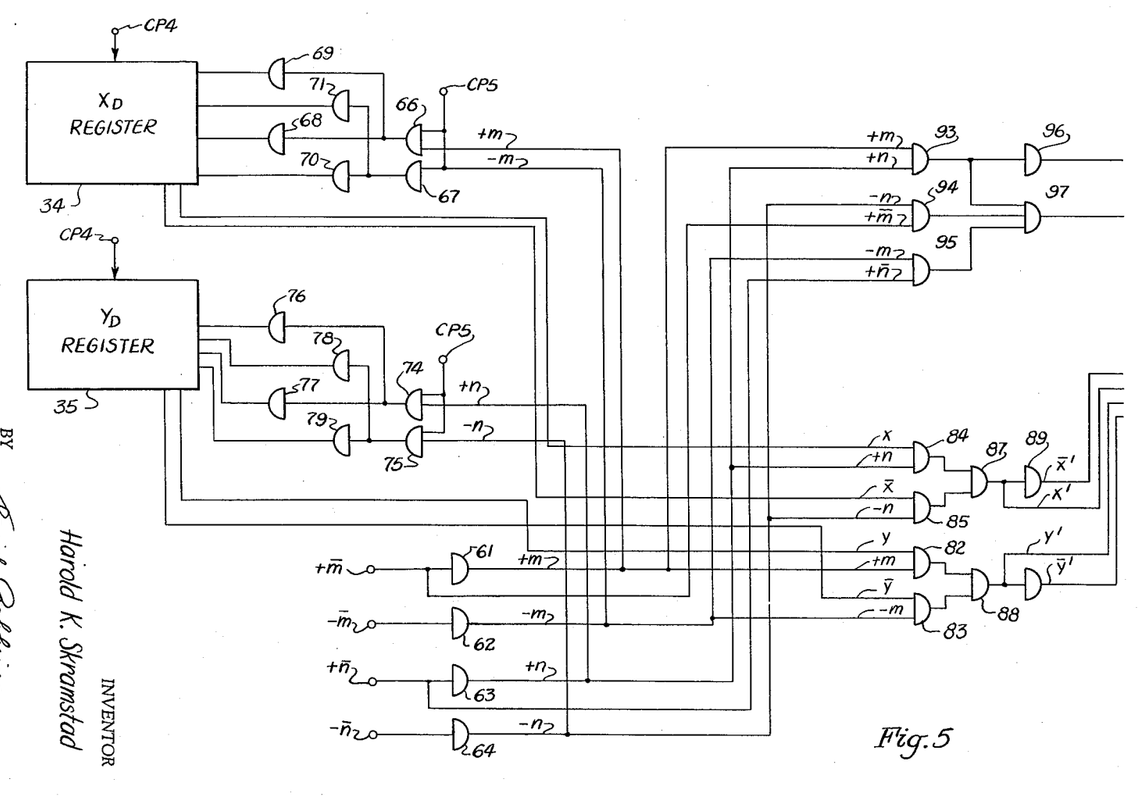
FIGS. 5 and 6 are circuit diagrams showing the relationship between the control unit, the adder and the registers associated therewith in FIG. 4.
Figures 6, 7:
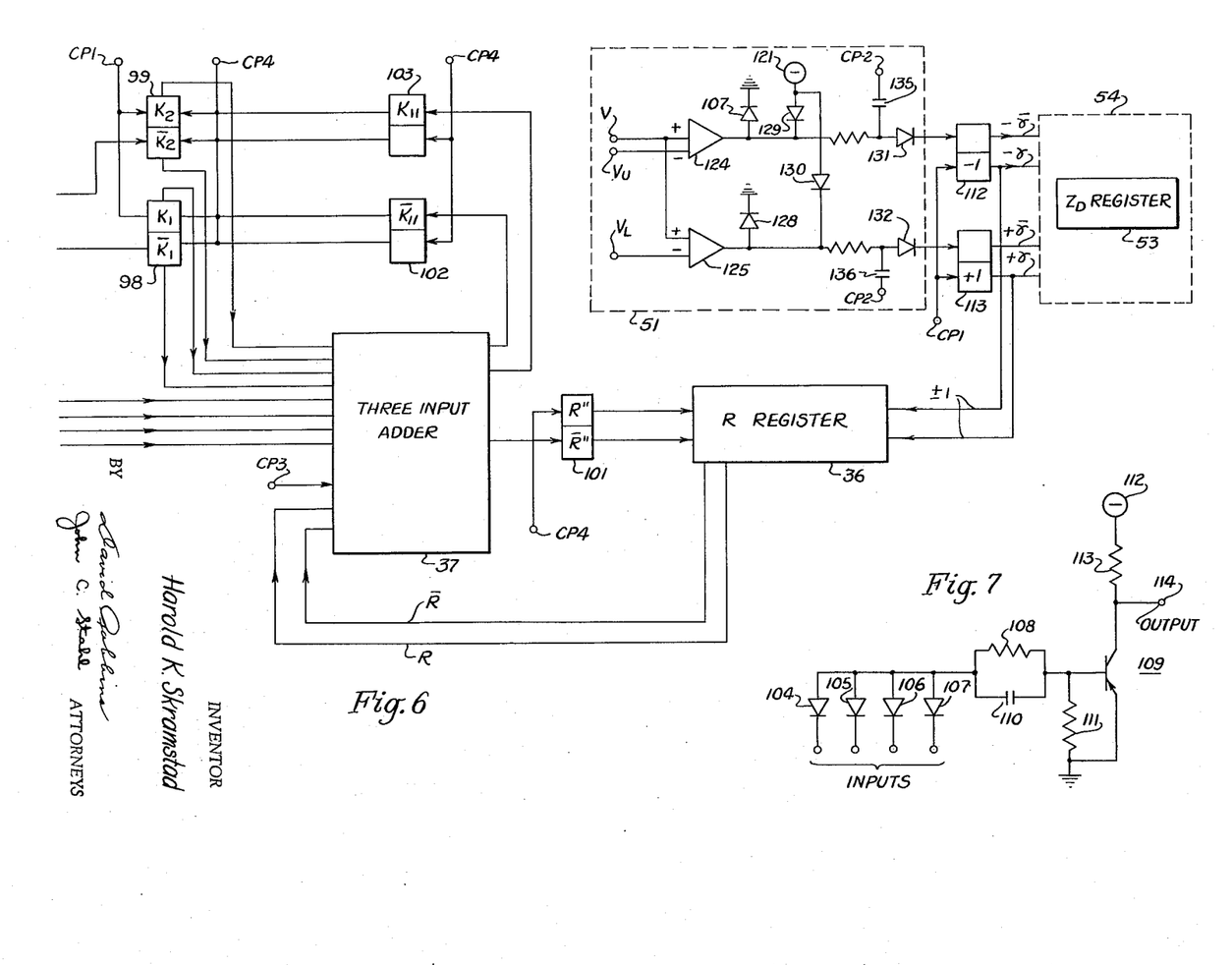
FIG. 7 is a circuit diagram of the and-or inverter employed in FIGS. 5 and 6.

Control unit 33 and the manner in which it cooperates with registers 34 to 36 and adder 37 is shown in detail in FIGS. 5 and 6.

A voltage having a magnitude $+E$ is applied to digital-to-analog converter 41 and to analog multiplier 31. The value of E in analog is equivalent to the value of $\alpha$ in digital, as defined above in connection with FIG. 1.

The output of R register 36 is transferred through storage register 42 to digital-to-analog converter 41 where it is converted to an analog voltage: $V_1 = ER$. Similarly, the output of $x_D$ register 34, transferred through storage register 45 to digital-to-analog converter 30, is converted to an analog voltage:

$$V_2 = \frac{Ex_D y_A}{\alpha}$$

and the output of $y_D$ register 35, transferred through register 47 to digital-to-analog converter 32, is converted to:

$$V_3 = \frac{Ey_D x_A}{\alpha}$$

The output of analog multiplier 31 is fed to attenuator 48 where it is attenuated by $\alpha$ to provide an analog voltage:

$$V_4 = \frac{Ex_A y_A}{\alpha}$$

Voltages $V_1$, $V_2$, $V_3$, $V_4$ are added in analog summer 49 to give the analog part of the output of the multiplier unit:

$$V = -(V_1 + V_2 + V_3 + V_4) = -\frac{EZ_A}{\alpha}$$

The output of analog summer 49 is applied to comparator 51 which is connected to overflow storage flip-flops 50. The latter is positioned between registers 36 and 53. $Z_D$ register 53 is usually located in the following unit in 54 the analyzer.

An upper threshold voltage $V_U$ and a lower threshold voltage $V_L$ is applied to comparator 51. Clock pulse CP1 is applied to registers 45, 47, 42 and storage flip-flops 50, clock pulse CP2 to comparator 51, clock pulse CP4 to registers 34, 35 and 36 and clock pulses CP1, CP4, and CP5 to control unit 33. The clock pulses, each having a period $\Delta t$, may, as indicated in connection with FIG. 1, be provided by a conventional signal generator, not shown.

Figure 3:
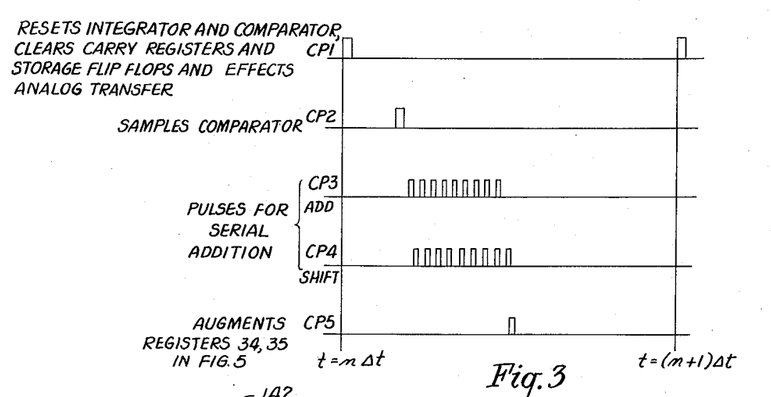
FIG. 3 is a time-clock pulse chart indicating the operation of the integrator unit in FIG. 1 and the multiplier unit in FIG. 4.

The operation of the multiplier in FIG. 4 can best be understood by referring to the chart in FIG. 3 and considering a typical operation during the time interval between $t=n\Delta t$ and $t=(n+1)\Delta t$ during which it is desired to multiply $(x_D+x_A)$ by $(y_D+y_A)$. The former quantity is represented by the digital information in register 34 and the analog voltage applied to converter 32 and the latter quantity by the digital information in register 35 and the analog voltage applied to converter 30.

The relationship between registers 34 to 36, adder 37 and control unit 33 is such that during the time interval, under the control of signals $+\overline{m}$, $-\overline{m}$, $+\overline{n}$, $-\overline{n}$, to the contents of R register 36, the following is added:

$$my_D + nx_D + mn\alpha \quad (14)$$

where:

$m$ and $n$ are $\pm 1$ or $0$

Clock pulse CP1 clears storage flip-flops 50 and effects the transfer of the information in registers 34 to 36 to storage registers 45, 47, and 42, respectively. This in effect transfers the information in registers 34 to 36 to digital-to-analog converters 30, 32 and 41. The information in the latter registers is held constant during the $(n+1)\Delta t$ period, unaffected by changes which occur in their associated registers during the period. Voltages $V_1$, $V_2$, $V_3$ and $V_4$ are added in analog summer 49 providing voltage $V$ which is fed to comparator 51. Clock pulse CP2, applied to the comparator, effects a comparison between voltages $V_U$ and $V$ and between voltages $V_L$ and $V$ which indicates one of three conditions: either voltage $V$ is less than voltage $V_L$, or $V$ is greater than $V_L$ and less than $V_U$ or $V$ is greater than $V_U$. Signals indicating this information are fed to storage flip-flops 50 to control registers 36 and 53. Specifically, under the first condition in response to clock pulse CP2, $+1$ is added to R register 36, under the third condition $-1$ is added and under the second condition the information is not altered. Under the first condition $-\alpha$ is added to $Z_D$ register 53, under the third $+\alpha$ is added and under the second, the information in the latter register is not altered.

If the information in register 36 is represented as R and that in register 53 as $Z_D$ the results may be summarized as follows:

| $V < V_L$ | $V_L < V < V_U$ | $V_U < V$ |
|---|---|---|
| add $+1$ to R | | add $-1$ to R |
| add $-\alpha$ to $Z_D$ | | add $+\alpha$ to $Z_D$ | where $p$, defined below, equals $\pm 1$ or $0$.

At the termination of the time interval under consideration, the desired product of $(x_A+x_D)$ and $(y_A+y_D)$ is equal to a number having a digital part represented by the information in $Z_D$ register 53 and an analog part represented by the magnitude of voltage $V$.

Now it will be shown that Equation 14 is the desired mathematical relationship between registers 34 to 36, control unit 33 and adder 37 and then in connection with FIGS. 5 and 6 one example of the means for obtaining this relationship will be presented.

It will be recalled that we wish to obtain $Z=xy$ where $x=x_D+x_A$, $y=y_D+y_A$ and $Z=Z_D+Z_A$ and where the digital parts of $x$, $y$ and $Z$ can change only at times which are integral multipliers of $\Delta t$. At any time out of the $n$th $\Delta t$ interval we have:

$$Z=Z_A+Z_D=x_Dy_D+x_Ay_D+x_Dy_A+x_Ay_A \quad (15)$$

Referring to FIG. 4, the digital part of Z, i.e. $Z_D$ is stored in register 53. The analog part $Z_A$ is proportional to V which is the output of analog summer 49. Let R be the number in register 36. Then we have:

$$V = -(V_1+V_2+V_3+V_4)$$
$$= -\left(ER + \frac{E}{\alpha}x_Dy_A + \frac{E}{\alpha}x_Ay_D + \frac{E}{\alpha}x_Ay_A\right)$$
$$= -\frac{E}{\alpha}(R\alpha + x_Dy_A + x_Ay_D + x_Ay_A)$$
$$= -\frac{E}{\alpha}Z_A \quad (16)$$

$$Z_A = R\alpha + x_Dy_A + x_Ay_D + x_Ay_A \quad (17)$$

Now $x_Dy_D$ is the product of two numbers, each not greater than one, and we split the product into a most and a least significant part, denoting each by subscript M and L, respectively:

$$x_Dy_D = (x_Dy_D)_M + (x_Dy_D)_L \quad (18)$$

If we let:

$$Z_D = (x_Dy_D)_M \quad (19)$$

Substituting Equations 18 and 19 in 15, we obtain:

$$Z_A = (x_Dy_D)_L + x_Dy_A + x_Ay_D + x_Ay_A \quad (20)$$

Equating Equation 17 to Equation 20, we obtain:

$$R = \frac{(x_Dy_D)_L}{\alpha}$$

Now consider what happens if between the $n$th and $(n+1)$th $\Delta t$ intervals, the digital values of $x$, $y$ and $Z$ change. We assume that each may change only by $\pm \alpha$, if at all. If primed letters denote values pertaining to the $(n+1)$th interval and unprimed letters for values of the $n$th interval, we have at the start of the $(n+1)\Delta t$ interval:

$x'_D = x_D + m\alpha$
$y'_D = y_D + n\alpha$
$Z'_D = Z_D + p\alpha$
$\alpha R' =$ information in R register 36 where $m$, $n$ and $p$ may each be $\pm 1$ or $0$.
$x'_Dy'_D = (x_D+m\alpha)(y_D+n\alpha)$
$\quad = x_Dy_D + m\alpha y_D + n\alpha x_D + mn\alpha^2$ In response to CP2 and in dependency upon the comparison that occurs in comparator 51, $p\alpha$ is subtracted from R register 36 and added to $Z_D$ register 53. Thus:

$$Z'_D = (x_Dy_D)m + p\alpha$$
$$\alpha R' = (x_Dy_D)_L + m\alpha y_D + n\alpha x_D + mn\alpha^2 - p\alpha$$

Since, at the start of the time interval, the information in R register 36 is equal to $(x_Dy_D)_L$, during the $(n+1)\Delta t$ th time interval we must add to the register:

$$my_D + nx_D + mn\alpha + p$$

Since p is added to register 36 in response to the comparison in comparator 51, from the last equation it is seen that the desired mathematical relationship between registers 34 to 36, control unit 33 and adder 37 is in fact represented by Equation 14.

Referring to FIGS. 5 and 6, signals $+\overline{m}$, $-\overline{m}$, $+\overline{n}$, $-\overline{n}$ are applied as digital inputs from other units in the analyzer to and-or inverters 61 to 64, respectively, to provide signals $+m$, $-m$, $+n$ and $-n$. The relationship between $+\overline{m}$ and $+m$ is such that when, for example, $m$ is equal to $-10$ volts to indicate binary 0 and is equal to 0 volts to indicate binary 1, then $+\overline{m}$ is equal to 0 volts to indicate binary 1 and $-10$ volts to indicate binary 0. A similar relationship exists between $-\overline{m}$ and $-m$, $+\overline{n}$ and $+n$, $-\overline{n}$ and $-n$, $x$ and $\overline{x}'$, $y$ and $\overline{y}'$. The digital inputs to and-or inverters 61 to 64 remain constant during each $\Delta t$ interval.

The outputs of and-or inverters 61, 62 are applied to and-or inverters 66, 67, respectively. The output of and-or inverter 66 is tied to and-or inverters 68, 69 while the output of and-or inverter 67 is tied to and-order inverters 70, 71. When clock pulse CP5 is applied to the input of and-or inverters 66, 67, inverters 68 to 71 apply signals to $x_D$ register 34 which add either $+\alpha$ or $-\alpha$ to the register depending upon whether $+m$ or $-m$, respectively, is present at the input of and-or inverters 66, 67.

In a similar manner, the outputs of and-or inverters 63, 64 are applied to the inputs of and-or inverters 74, 75, respectively. The output of and-or inverter 74 is applied to and-or inverters 76, 77 while the output of and-or inverter 75 is applied to and-or inverters 78, 79. Thus, when clock pulse CP5 is fed to the input of and-or inverters 74, 75, inverters 76 to 79 apply signals to $y_D$ register 35 which add $+\alpha$ or $-\alpha$ thereto depending upon whether $+n$ or $-n$, respectively, is present at the input of inverters 74, 75.

The outputs of each of and-or inverters 61 to 64 are also applied to a respective input of and-or inverters 82 to 85. The outputs of and-or inverters 84, 85 are fed to and-or inverter 87; the outputs of and-or inverters 82, 83 to and-or inverter 88; the output of and-or inverter 87 to three-input adder 37 and to and-or adder 89; the output of and-or inverter 88 to and-or inverter 90 and adder 37. Signals $y$ and $\overline{y}$ are applied from $y_D$ register 35 to inverters 82, 83, respectively, while signals $x$ and $\overline{x}$ are applied from $x_D$ register 34 to inverters 84, 85, respectively.

Continuing the description of FIGS. 5 and 6, the outputs of each of and-or inverters 61 to 64 are applied to a respective one of and-or inverters 93 to 95 while signals $+\overline{m}$ and $+\overline{n}$ are applied to and-or inverters 94, 95, respectively. The output of and-or inverter 93 is fed to and-or inverter 96 while the outputs of and-or inverters 93 to 95 are all applied to and-or inverter 97. Inverters 96 and 97 are connected to carry registers 98, 99, respectively. The carry registers may be conventional flip-flop circuits. All the and-or inverters in FIG. 5 are identical and are shown in detail in FIG. 7. When, for example, only one lead is connected in the input of one of the and-or inverters in FIG. 5, only one input lead in FIG. 7 is used.

Referring to FIG. 7, input signals are applied to one or more of the cathodes of diodes 104 to 107. The anodes of the diodes are connected together and through resistor 108 to the base of transistor 109. Capacitor 110, positioned across the resistor, is selected to provide high speed switching. The base of the transistor is connected to ground through resistor 111, the emitter is grounded, and the collector is tied to negative potential source 112 through resistor 113. Output terminal 114 is tied to the collector. Resistors 113, 114 are selected so that a negative signal of desired magnitude applied to diodes 104 to 107 will cause current to flow through transistor 109, saturating the transistor.

In operation, when a negative signal is applied to the cathodes of at least one of diodes 104 to 107, a signal is applied through resistor 108 to the base of transistor 109 causing current flow that saturates the transistor. The voltage on output terminal 114 will then be zero. When a signal having zero volts magnitude is applied to the base, transistor 109 is cut off and a signal having a desired negative magnitude appears on terminal 114.

Signals $\overline{x}'$, $x'$, $y'$, $\overline{y}'$, which appear in the outputs of and-or inverters 87 to 90 under the operating conditions indicated below, are applied to three-input adder 37; signals R, $\overline{R}$ derived from register 36 are also applied to the adder. One output of adder 37 is fed to register 101 so that in response to clock pulse CP4 either signal R″ or $\overline{R}''$ is applied to register 36. Other outputs of adder 37 are applied to carry registers 102, 103, respectively, and the output of each of these registers in response to CP4 is applied to a respective one of carry registers 98, 99 while the outputs of the latter register in response to the same pulse is applied to adder 37. Reset clock pulse CP1 is applied in parallel to carry registers 98, 99. Register 99 to 103 may be conventional flip-flop circuits.

Referring to FIG. 6, it is noted that comparator 51 comprises a pair of high-gain amplifiers 124, 125 and that voltage V, the output of analog summer 49, is applied in parallel to the amplifiers while each of voltages $V_U$ and $V_L$ are applied to a respective one of the amplifiers. Clamping diodes 127, 128 are each connected between one of the outputs of amplifiers 124, 125 and ground and clamping diodes 129, 130 between one of the outputs and source of negative potential 121. The diodes maintain the output of the amplifiers within desired limits. The output of amplifier 124 is applied through resistor 137 and diode 131 to overflow flip-flop storage register 133 while the output of amplifier 125 is applied through resistor 138 and diode 132 to flip-flop storage register 134. Clock pulse CP2 is applied to the anode of diode 131 through capacitor 135 and to the anode of diode 132 through capacitor 136.

Finally, the outputs of registers 133 and 134, represented by signals $-\gamma$, $-\overline{\gamma}$, $+\gamma$ and $+\overline{\gamma}$, are applied to $Z_D$ register 53 which is usually located in the succeeding unit 54 in the analyzer.

In a typical operation of comparator 51, if it is assumed that clock pulse CP2 has a positive polarity, when $V_L < V < V_U$ the outputs of the amplifiers have a negative polarity and a magnitude sufficient to block the passage of clock pulse CP2 through capacitors 135 and 136 to the anodes of diodes 131 and 132. If $V < V_L$, the output of amplifier 125 is increased in the positive direction and has a level which permits the passage of clock pulse CP2 through capacitor 136 and diode 132 to flip-flop register 134. The register provides signals that add +1 to R register 36 and effect the addition of $-\alpha$ to $Z_D$ register 53 located in the following unit in the analyzer. (In this case $p$, defined above, is equal to +1.)

Before considering a typical operation of FIGS. 5 and 6, it is necessary to appreciate that the mathematical calculations performed are in two's complement arithmetic in which a negation of a digital number is accomplished by changing all zeros to ones, and conversely, and then adding one bit in the least significant place. Thus, where $x = 1001$, in two's complement arithmetic, $\overline{x} = 0110$ and $-x = 0111$.

In a typical operation occuring in the time interval between $n\Delta t$ and $(n+1)\Delta t$ (FIG. 3) clock pulse CP1 clears storage registers flip-flops 133, 134 and carry registers 98, 99. Clock pulse CP2 effects a comparison between voltages V, supplied by analog summer 49 (FIG. 4) and $V_U$ and between voltages V and $V_L$. If, as indicated above, $V < V_L$ then +1 is added to R register 36 and signals which will effect the addition of $-\alpha$ to the contents of $Z_D$ register 53 are applied to another unit 54 of the analyzer. Signals $+\gamma$, $-\gamma$, $+\overline{\gamma}$ and $-\overline{\gamma}$, which provide this result, could be used to control and-or inverters in unit 54 similar to inverters 61 to 64 in FIG. 5. Thus, for purposes of this illustration we may say that in response to CP2, the storage registers, similar to registers 133, 134 in another unit in the analyzer applies signals $+\overline{m}$, $-\overline{m}$, $+\overline{n}$, $-\overline{n}$ to and-or inverters 61 to 64. These signals control the various circuits in FIGS. 5 and 6 and preload carry registers 98, 99 so that in response to the clock pulses CP1 to CP5, as indicated below, $R + my + nx_D + nm\alpha + p$ is contained in R register 36 at the termination of the time interval under consideration. (It is noted that $p$, which in this case is ±1 or 0 was added to the register in response to clock pulse CP2 in dependency upon the comparison occurring in comparator 51.) The operations performed to obtain this result are summarized in the following chart:

| $m$ | $n$ | Circuit Does | Necessary Corrections | | | Initially Stored in Registers 98, 99 | Add to Register 34 | Add to Register 35 |
|---|---|---|---|---|---|---|---|---|
| | | | $nm\alpha$ | for $y$ | for $x$ | | | |
| 1 | 1 | $R+\bar{y}+\bar{x}$ | $\alpha$ | 0 | 0 | $\alpha$ | $\alpha$ | $\alpha$ |
| 1 | 0 | $R+\bar{y}+0$ | 0 | 0 | 0 | 0 | $\alpha$ | 0 |
| 1 | −1 | $R+\bar{y}+\bar{x}$ | −$\alpha$ | 0 | $\alpha$ | 0 | $\alpha$ | −$\alpha$ |
| 0 | 1 | $R+0+x$ | 0 | 0 | 0 | 0 | 0 | $\alpha$ |
| 0 | 0 | $R+0+0$ | 0 | 0 | 0 | 0 | 0 | 0 |
| 0 | −1 | $R+0+\bar{x}$ | 0 | 0 | $\alpha$ | $\alpha$ | 0 | −$\alpha$ |
| −1 | 1 | $R+\bar{y}+x$ | −$\alpha$ | $\alpha$ | 0 | 0 | −$\alpha$ | $\alpha$ |
| −1 | 0 | $R+\bar{y}+0$ | 0 | $\alpha$ | 0 | $\alpha$ | −$\alpha$ | 0 |
| −1 | −1 | $R+\bar{y}+\bar{x}$ | $\alpha$ | $\alpha$ | $\alpha$ | $3\alpha$ | −$\alpha$ | −$\alpha$ |

NOTE.—For clarity, subscripts D have been omitted from the chart.

To illustrate the information contained in this chart, assume that signals $-\overline{m}$ and $-\overline{n}$ are applied to and-or inverters 62, 64, respectively. Since the outputs of the inverters will be $m=-1$ and $n=-1$, the operations summarized in the last line of the chart are to be performed. The necessary correction, as indicated in this line, is $3\alpha$. Hence, the signals applied to and-or inverters 93 to 95 control inverters 96, 97 so that carry registers 98, 99 are preloaded with this desired information. Signal $-m$ is applied to inverter 83 so that in response to each shift pulse CP4, a signal $\bar{y}$ representing a bit in $y_D$ register 35 is transferred through and-or inverters 83, 88 and 90 and signal $\bar{y}'$ is applied to adder 37. Similarly, signal $-n$ is applied to and-or inverter 85 so that in response to each shift pulse CP4, a signal $\bar{x}$ representing a bit in $x_D$ register 34 is transferred through inverters 85, 87 and 89 and signal $\bar{x}'$ is applied to adder 37.

In response to each shift pulse CP4, a bit from R register 36 is applied to adder 37. Also, in response to each pulse CP4, the carry bit in adder 37 is applied to registers 102, 103, the information in registers 102, 103 is transferred to registers 98, 99 and the information in the latter registers is fed to the adder. In response to each add pulse CP3 occuring after each shift pulse CP4 (see FIG. 3) the three inputs to adder 37, derived from registers 34 to 36, are added. Signals indicating the sum are applied to register 37a and transferred to R register 36 in response to shift pulse CP4. As a final step in the operation since signals $-m$ and $-n$ are applied to and-or inverters 67, 75, respectively, in response to clock pulse CP5, $-\alpha$ is added to each of registers 34, 35.

It should be noted that for small values of $\alpha$ analog multiplier 31 may be omitted, producing a maximum error of $\alpha$ in the analog part of the output. For values of $\alpha$ less than the resolution of the analog components, say .001 or less, this error is negligible.

If one of the factors to be multiplied is a constant, the equipment required is simplified, since only one register 34 or 35 needs to be capable of accepting increments, and register 36 receives additions from only one other register. If the factor is a purely digital quantity, one of the digital-to-analog converters 30, 32 and the analog multiplier 31 may be omitted.

Figure 8:
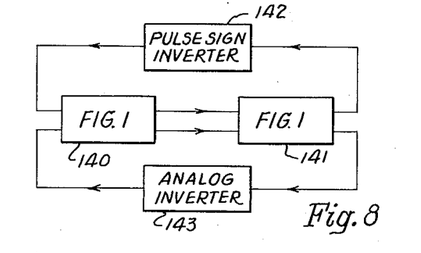
FIG. 8 is a block diagram of an analyzer that may be used to solve the pair of differential equations.

The integrator and multiplier units disclosed in FIGS. 1 and 4 may be used in various combinations to solve differential equations, the particular combination being dependent upon the differential equation to be solved. By way of example, FIG. 8 shows a block diagram of an analyzer for solving the pair of differential equations:

$$\dot{x}=-x'$$

$$\dot{x}'=-x$$

The structure in each of the blocks 140, 141 is identical to the integrator unit in FIG. 1 except that register 23 is omitted and the output of overflow storage flip-flops 22 in block 140 is applied directly to the input of register 19 in block 141 and the output of overflow storage flip-flops 22 in block 141 is applied to register 19 in block 140 through pulse sign inverter 142. The output of analog summer 16 in block 141 is applied through analog inverter 143 to the input of the analog integrator 19 in block 140. A detailed explanation of the operation of the analyzer in FIG. 8, as well as another example of an analyzer that may be used to solve the simple differential equation: $\dot{x}=-x$, may be found in an article written by the applicant and published in the 1959 Proceedings of the Eastern Joint Computer Conference (1960) pages 94–100.

Obviously many modifications and variations of the present invention are possible in the light of the above teachings. It is therefore to be understood, that within the scope of the appendant claims, the invention may be practiced otherwise than as specifically described.

What is claimed is:

1. In a system for solving differential equations with problem variables being represented by a digital part and an analog part, a digital register, means for converting the contents of said digital register to an analog signal, a first analog integrator connected to the output of said last-mentioned means, a second analog integrator, means for applying an analog signal to said second analog integrator, and means for combining the magnitudes of the outputs of said first and second analog integrator.

2. In a system for solving differential equations with problem variables being represented by a digital part and an analog part, a first and second digital register, means for converting the contents of said first and second digital register to a first and second analog signal, respectively, means for maintaining the magnitudes of said first and second analog signal substantially constant during a selected time interval, a first and second analog integrator, means for applying said first analog signal to said first analog integrator, means for applying a third analog signal to said second analog integrator, means for combining the magnitudes of the output of said first and second analog integrator and said second analog signal, and means for selectively controlling the contents of said second digital register in dependency upon the contents of said first digital register.

3. In a system for solving differential equations with problem variables being represented by a digital part and an analog part, a first and second digital register, a first and second storage register, means for transferring the contents of said first and second digital register to said first and second storage register, respectively, means for converting the output of said first and second digital register to a first and second analog signal, respectively, a first and second analog integrator, means for applying said first analog signal to said first analog integrator, means for applying a third analog signal to said second analog integrator, means for combining the magnitudes of the output of said first and second analog integrator and said second analog signal, and means for selectively controlling the contents of said second digital register in dependency upon the contents of said first digital register.

4. In a system for solving differential equations with problem variables being represented by a digital part and an analog part, a first digital register, means for converting the contents of said first register to a first analog signal, an analog summer, means for applying said first analog signal and a second analog signal to said analog summer, means connected to the output of said analog summer for providing a comparison between at least one signal and an analog signal, a second register, and means dependent upon said comparison for adding a first signal having a selected magnitude and sign to said first register and a second signal having a selected magnitude and a sign opposite to said first signal to said second register.

5. In a system for solving differential equations with problem variables being represented by a digital part and an analog part, a first and second digital register, means for converting the output of said first and second digital register to a first and second analog signal, respectively, means for maintaining the magnitudes of said first and second analog signal substantially constant during a selected time interval, a first and second analog integrator, means for applying said first analog signal to said first analog integrator, means for applying a third analog signal to said second analog integrator, summing means for combining the magnitudes of the output of said first and second analog integrator and said second analog signal, means connected to the output of said summing means for providing a comparison between at least one signal and an analog signal, a third register, means dependent upon said comparison for adding a signal having a selected magnitude and sign to said second register and a second signal having a selected magnitude and sign opposite to said first signal to said third register, and means for selectively controlling the contents of said second digital register during said selected time interval in dependency upon the contents of said first digital register.

6. In a system for solving differential equations with problem variables being represented by a digital part and an analog part, a first and second digital register, a first and second storage register, means for transferring the contents of said first and second digital register to said first and second storage register, respectively, means for converting the output of said first and second digital register to a first and second analog signal, respectively, a first and second analog converter, means for applying said first analog signal to said first analog integrator, means for applying a third analog signal to said second analog integrator, summing means for combining the magnitudes of the output of said first and second analog integrator and said second analog signal, means connected to the output of said summing means for providing a comparison between at least one signal and an analog signal, a third digital register, means dependent upon said comparison for adding a first signal having a selected magnitude and sign to said second digital register and a second signal having a selected magnitude and a sign opposite to said first signal to said third digital register, and means for adding the contents of said first digital register to the contents of said second digital register without altering the contents of said first register.

7. In a system for solving differential equations with problem variables being represented by a digital part and an analog part, a first, second and third digital register, an analog summer, a first and second digital-to-analog converter, each connected between the output of a respective one of said first and third digital register and the input of said analog summer, means for applying an analog signal to said first digital-to-analog converter, means for maintaining the output of said first and second digital-to-analog converter substantially constant during a selected time interval, means for selectively incrementing said first digital register, means for selectively adding the contents of said first and second digital register to the contents of said third digital register during said selected time interval without altering the contents of said first and second digital register.

8. In a system for solving differential equations with problem variables being represented by a digital part and an analog part, a first, second and third digital register, an analog summer, a first and second digital-to-analog converter, each connected between the output of a respective one of said first and third digital register and the input of said analog summer, means for applying an analog signal to said first digital-to-analog converter, means for maintaining the output of said first and second digital-to-analog converter substantially constant during a selected time interval, means for selectively controlling the contents of said first digital register, means for selectively controlling the contents of said third register during said selected time interval in dependency upon the contents of said first and second register, means connected to the output of said analog summer for providing a comparison between at least one signal and an analog signal, a fourth digital register, and means dependent upon said comparison for adding a first signal having a selected magnitude and sign to said third register and a second signal having a selected magnitude and a sign opposite to said first signal to said fourth digital register.

9. In a system for solving differential equations with problem variables being represented by a digital part and an analog part, a first, second, and third digital register, an analog summer, a first, second, and third digital-to-analog converter, each connected between the output of a respective one of said first, second, and third digital register and the input of said analog summer, means for applying a first and second analog signal to said first and second digital-to-analog converter, respectively, means for maintaining the output of said first, second, and third digital-to-analog converter substantially constant during a selected time interval, means for selectively controlling the contents of said first and second digital register, means for selectively controlling the contents of said third digital register during said selected time interval in dependency upon the contents of said first and second digital registers.

10. The system set forth in claim 9 including an analog multiplier, means for applying said first and second analog signal to said analog multiplier, and an attenuator connected between the output of said analog multiplier and the input of said analog summer.

11. In a system for solving differential equations with problem variables being represented by a digital part and an analog part, a first, second and third digital register, an analog summer, a first and second digital-to-analog converter, each connected between the output of a respective one of said first and third digital register and the input of said analog summer, means for applying an analog signal to said first digital-to-analog converter, means for maintaining the output of said first and second digital-to-analog converter substantially constant during a selected time interval, means for selectively controlling the contents of said first digital register, means for adding to said third digital register signals dependent upon the selective incrementation of said first register, means for selectively adding the contents of said first and second digital register to the contents of said third digital register during said selected time interval without altering the contents of said first and second digital register.

12. In a system for solving differential equations with problem variables being represented by a digital part and an analog part, a first, second and third digital register, an analog summer, a first and second digital-to-analog converter, each connected between the output of a respective one of said first and third digital register and the input of said analog summer, means for applying an analog signal to said first digital-to-analog converter, means for maintaining the output of said first and second digital-to-analog converter substantially constant during a selected time interval, means for selectively incrementing said first digital register, means for adding to said third digital register a signal dependent upon the selective incrementation of said first register, means for selectively adding the contents of said first and second digital register to the contents of said third digital register during said selected time interval without altering the contents of said first and second register, means connected to the output of said analog summer for providing a comparison between at least one signal and an analog signal, a fourth digital register, and means dependent upon said comparison for adding a first signal having a selected magnitude and sign to said third register and a second signal having a selected magnitude and a sign opposite to said first signal to said fourth digital register.

13. In a system for solving differential equations with problem variables being represented by a digital part and an analog part, a first, second, and third digital register, an analog summer, a first, second, and third digital-to-analog converter, each connected between the output of a respective one of said first, second, and third digital register and the input of said analog summer, means for applying a first and second analog signal to said first and second digital-to-analog converter, respectively, means for maintaining the output of said first, second and third digital-to-analog converter substantially constant during a selected time interval, means for selectively incrementing said first and second digital register, means for adding to said third digital register a signal dependent upon the selective incrementation of said first and second register, means for selectively adding the contents of said first and second digital register to the contents of said third digital register during said selected time interval without altering the contents of said first and second digital register.

14. In a system for solving differential equations with problem variables being represented by a digital part and an analog part, a first, second, and third digital register, an analog summer, a first, second and third digital-to-analog converter, each connected between the output of a respective one of said first, second and third digital register and the input of said analog summer, means for applying a first and second analog signal to said first and second digital-to-analog converter, respectively, means for maintaining the output of said first, second, and third digital-to-analog converter substantially constant during a selected time interval, means for selectively incrementing said first and second digital register, means for adding to said third digital register a signal dependent upon the selective incrementation of said first and second register, means for selectively adding the contents of said first and second digital register to the contents of said third digital register during said selected time interval without altering the contents of said first and second digital register, means connected to the output of said analog summer for providing a comparison between at least one signal and an analog signal, a fourth digital register, and means dependent upon said comparison for adding a first signal having a selected magnitude and sign to said third digital register and a second signal having a selected magnitude and a sign opposite to said first signal to said fourth digital register.

15. The system set forth in claim 14 including an analog multiplier, means for applying said first and second analog signal to said multiplier, and an attenuator connected between the output of said analog multiplier and the input of said analog summer.

16. In a system for solving differential equations with problem variables being represented as a digital part and an analog part, a first and second digital register, means for selectively controlling the contents of said first digital register, means for converting the output of said first register to a first analog signal, an analog summer, means for applying said first analog signal and at least a second analog signal to said analog summer, means for selectively controlling the contents of said second register in dependency upon the contents of said first register, means connected to the output of said analog summer for providing a comparison between at least one signal and an analog signal, a third digital register, and means dependent upon said comparison for adding a first signal having a selected magnitude and sign to said second register and a second signal having a selected magnitude and a sign opposite to said first signal to said third register.

17. In a system for solving differential equations with problem variables being represented by a digital part and an analog part, a first, second and third digital register, an analog summer, a first, second and third digital-to-analog converter, each connected between the output of a respective one of said first, second and third digital registers and the input of said analog summer, means for applying a first and second analog signal to said first and second digital-to-analog converter, respectively, means for maintaining the output of said first, second and third digital-to-analog converter substantially constant during a selected time interval, means for selectively controlling the contents of said first and second digital register, means for selectively controlling the contents of said third digital register during said selected time interval in dependency upon the contents of said first and second digital registers, means connected to the output of said analog summer for providing a comparison between at least one signal and an analog signal, a fourth digital register, and means dependent upon said comparison for adding a first signal having a selected magnitude and sign to said third digital register and a second signal having a selected mgnitude and a sign opposite to said first signal to said fourth digital register.

18. The system set forth in claim 17 including an analog multiplier having an output connected to the input of said analog summer and means for applying said first and second analog signal to the input of said analog multiplier.

19. The system set forth in claim 17 including an attenuator having an output connected to an input of said analog summer, an analog multiplier having an output connected to the input of said attenuator and means for applying said first and second analog signal to the input of said analog multiplier.

References Cited in the file of this patent
UNITED STATES PATENTS

| | | |
|---|---|---|
| 2,663,495 | Ramsell et al. | Dec. 22, 1953 |
| 2,865,564 | Kaiser et al. | Dec. 23, 1958 |
| 2,869,786 | Jacobsohn et al. | Jan. 20, 1959 |
| 2,916,209 | Adamson et al. | Dec. 8, 1959 |